United States Patent [19]
Wiley et al.

[11] Patent Number: 5,689,999
[45] Date of Patent: Nov. 25, 1997

[54] ADJUSTABLE ROTARY LOCKING AND UNLOCKING APPARATUS

[75] Inventors: Robert A. Wiley; Dwight S. Gay; Michael J. Larkin, all of Millington, Mich.

[73] Assignee: Gunnell, Inc., Millington, Mich.

[21] Appl. No.: 516,749

[22] Filed: Aug. 18, 1995

[51] Int. Cl.$^6$ ........................................ G05G 5/06
[52] U.S. Cl. ........................... 74/527; 403/107; 403/95
[58] Field of Search ........................... 74/527; 403/107, 403/106, 95, 93

[56] References Cited

U.S. PATENT DOCUMENTS

| | | | |
|---|---|---|---|
| 1,044,055 | 11/1912 | Johnson et al. | 403/107 |
| 1,887,878 | 11/1932 | Smith. | |
| 1,894,489 | 1/1933 | Hirose et al. | |
| 2,503,281 | 4/1950 | Lynch et al. | 403/107 X |
| 2,921,773 | 1/1960 | Hoelzer. | |
| 3,768,333 | 10/1973 | Bidwell | 74/527 |
| 4,666,328 | 5/1987 | Ryu | 403/93 X |
| 4,966,046 | 10/1990 | Tagawa. | |
| 5,056,805 | 10/1991 | Wang | 403/93 X |
| 5,222,412 | 6/1993 | Nagano. | |
| 5,279,387 | 1/1994 | Swiderski et al. | |

FOREIGN PATENT DOCUMENTS 476557  10/1975  U.S.S.R. .

Primary Examiner—Charles A. Marmor
Assistant Examiner—Mary Ann Battista
Attorney, Agent, or Firm—Learman & McCulloch

[57] ABSTRACT

Apparatus for enabling and disabling relative rotary movements between two members rotatable about a common axis comprises a plurality of circumferentially spaced locking pins carried by one of the members and a plurality of circumferentially spaced sockets in the other of the members, the pins and sockets being uniformly spaced from the axis of rotation and each of the sockets being of such size as to accommodate any one of the pins. The number of pins is different from the number of sockets. The angular spacing between adjacent pins is uniform, and the angular spacing between adjacent sockets is uniform, but different from the angular spacing between adjacent pins. The angular spacing between the pins and the sockets defines a ratio which is not a whole integer.

16 Claims, 5 Drawing Sheets

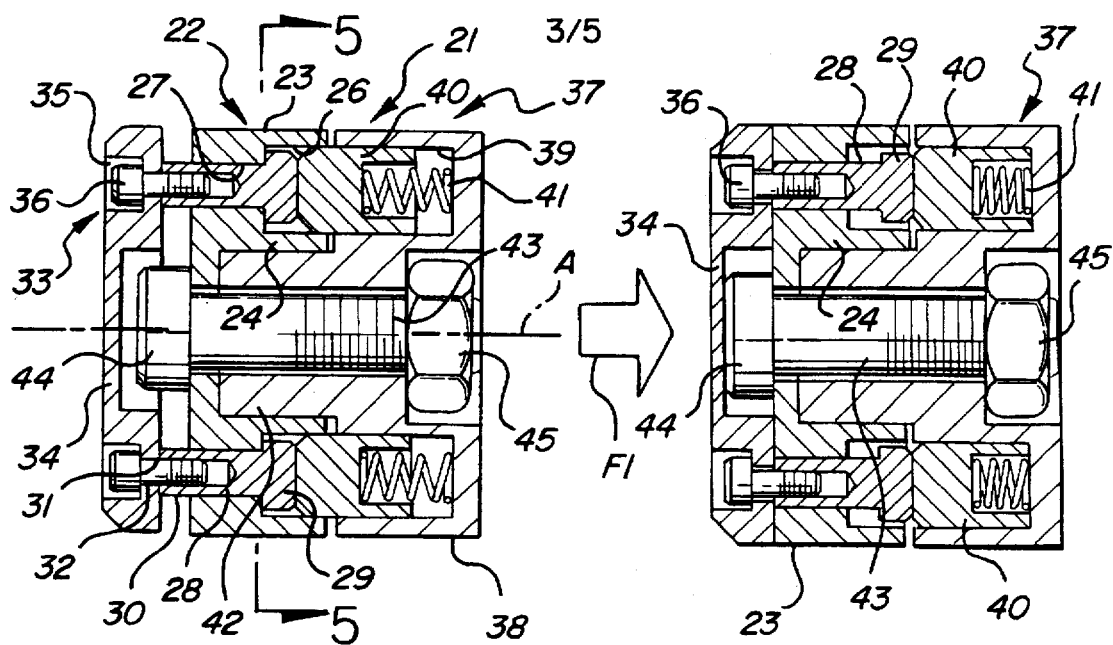
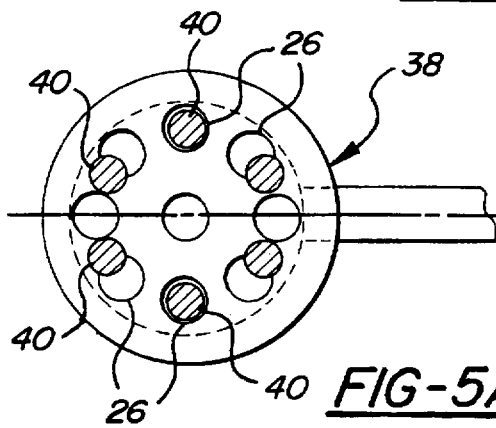
FIG-5A
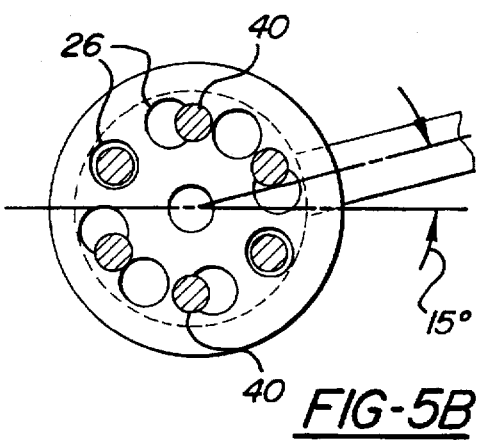
FIG-5B
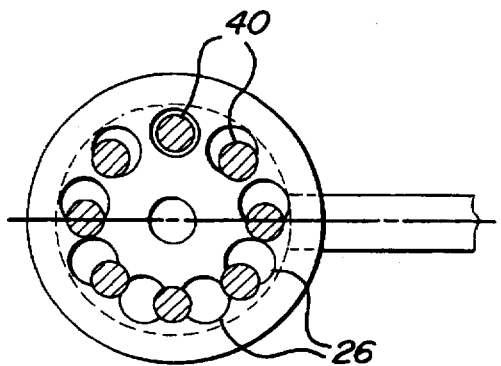
FIG-6A
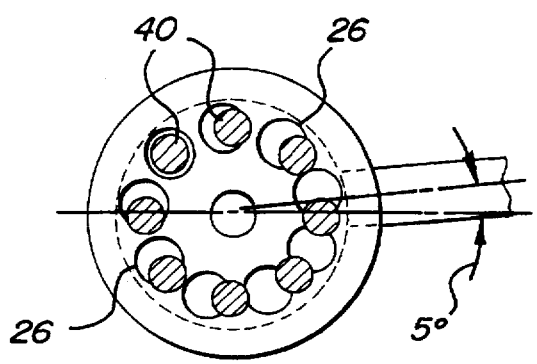
FIG-6B

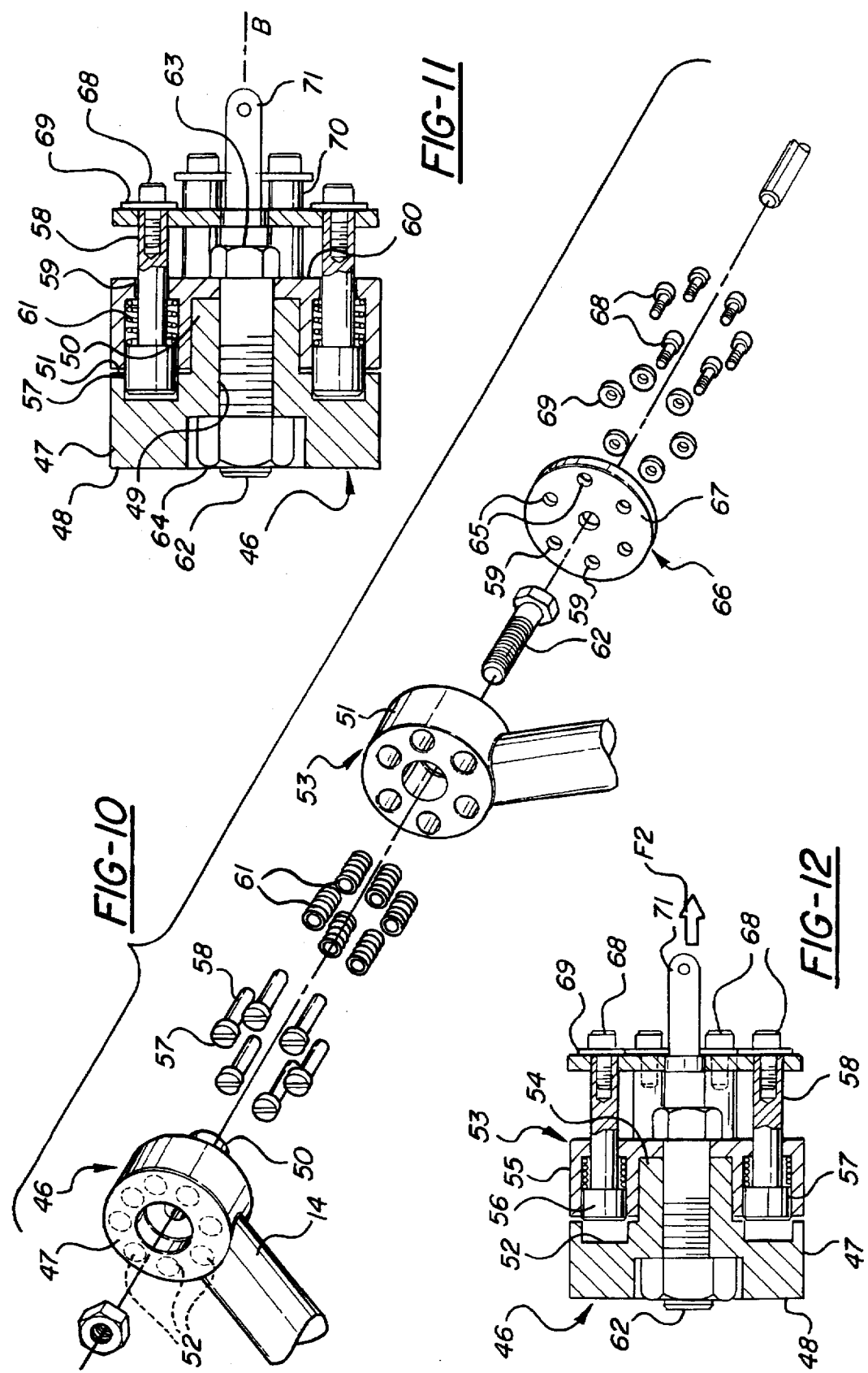

ADJUSTABLE ROTARY LOCKING AND UNLOCKING APPARATUS

This invention relates to apparatus for releasably locking two relatively rotatable members in any selected one of a number of adjusted positions and wherein the extent of angular adjustment is a function of differences between the number and spacing between locking pins and sockets into which the locking pins may be projected.

BACKGROUND OF THE INVENTION

There are many instances in which two relatively rotatable members must be adjusted angularly and fixed in the adjusted position. It is fairly common to provide on one of the members one or more locking pins which may be accommodated in sockets provided in the other rotary member, and vice versa. The locking pin or pins may be spring biased toward their projected positions and coupled to an operator which, in some instances, enables all of the projected coupling pins to be withdrawn from the sockets simultaneously.

Conventional locking and unlocking mechanisms for use with relatively rotatable members comprise either a plurality of angularly spaced locking pins or a plurality of angularly spaced sockets. However, the angular spacing between adjacent pins or sockets is uniform. Thus, if one rotary member carries only one locking pin or two locking pins angularly spaced 10° from one another, and if the sockets in the companion rotary member are angularly spaced 10° apart, the minimum relative angular adjustment between the two members cannot be less than 10°.

In many instances it is desirable to provide an angular adjustment between two rotary members which is less than the angular spacing between locking pins and the angular spacing between sockets. For example, angular adjustment of relatively movable parts of an invalid's wheelchair often is required to provide adequate support and comfort for the occupant. However, if the angular adjustment required is greater or lesser than that provided by the conventional adjusting apparatus, the most desirable adjustment may be impossible to achieve. The same observation applies, of course, to angular adjustment of relatively adjustable members which are independent of and have nothing to do with the support of invalids or other persons.

A principal object of the present invention is to provide adjustable rotary locking and unlocking apparatus which overcomes the disadvantages referred to above.

SUMMARY OF THE INVENTION

Apparatus constructed in accordance with a preferred embodiment of the invention is adapted to enable relative rotary adjustment between two members that are relatively rotatable about an axis. One of the members carries a plurality of arcuately spaced locking pins that are movable between retracted and projected positions, and the other member has a plurality of arcuately spaced sockets, each of such sockets being capable of accommodating any of the locking pins. All of the sockets and all of the locking pins are uniformly spaced from the axis of rotation of the members.

The arcuate spacing between adjacent locking pins is uniform and the arcuate spacing between adjacent sockets is uniform, but the arcuate spacing between adjacent locking pins is not the same as the spacing between adjacent sockets. As a consequence, the ratio defined by the arcuate pin and socket spacings is not a whole integer and it thus is not possible for all of the locking pins to be accommodated in sockets at the same time.

Any locking pin that is in register with a socket may be projected into such socket so as thereby to disable the two members from relative rotation. Operating means is provided to effect withdrawal of all of the locking pins to a retracted position in which none of them occupies a socket and to maintain all of the locking pins in their retracted position until such time as it is desired to permit one or more of the locking pins to be projected into one or more sockets.

Because of the difference in spacing between adjacent locking pins on the one hand and adjacent sockets on the other hand, it is possible to adjust the two members angularly to an extent which is not the same as the angular spacing between adjacent locking pins or adjacent sockets.

THE DRAWINGS

Apparatus constructed in accordance with two embodiments of the invention are disclosed in the accompanying drawings, wherein:

FIG. 3 is an enlarged, cross-sectional view showing the apparatus in adjusted, locked position;

FIG. 4 is a view similar to FIG. 3 but illustrated in the apparatus in an unlocked condition;

FIGS. 5a and 5b are diagrammatic views illustrating two relatively adjusted positions of the apparatus;

FIGS. 6a and 6b are diagrammatic views of relatively adjusted positions of apparatus similar to that disclosed in FIG. 5, but incorporating a different number of locking pins and sockets;

Figure 1:
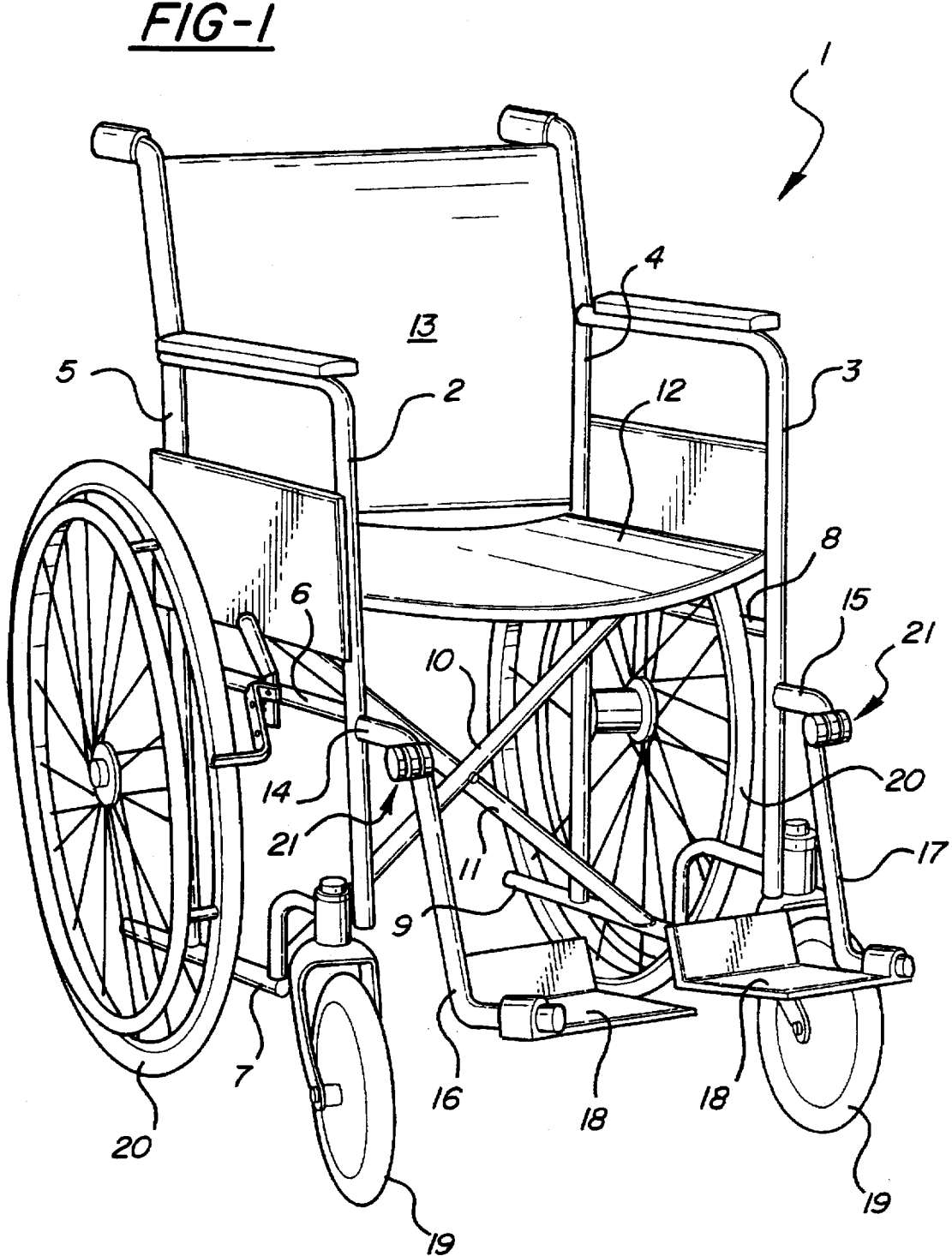
FIG. 1 is an isometric view of an invalid's wheelchair equipped with adjustable foot rests and incorporating rotary adjusting apparatus constructed in accordance with either embodiment of the invention.

FIGS. 7a, 7b, 8a, 8b, 9a, and 9b are views similar to FIGS. 5 and 6, but illustrating different combinations of locking pins and sockets;

FIG. 10 is an exploded view of another embodiment of the invention;

FIG. 11 is a sectional view of the embodiment shown in FIG. 10 and illustrating the locking pins in their projected position; and FIG. 12 is a view similar to FIG. 11, but illustrating the locking pins in their retracted position.

THE PREFERRED EMBODIMENTS

Apparatus constructed in accordance with either of the disclosed embodiments of the invention is adapted for use in virtually any construction in which two relatively rotatable members may be releasably locked in any selected one of a number of adjusted positions. As disclosed, the locking and unlocking apparatus of the invention is embodied in a wheelchair 1 having spaced apart, vertically extending frame members 2, 3 and 4, 5 joined together by horizontal cross members 6, 7 and 8, 9. Cross bars 10 and 11 join opposite sides of the frame to one another. Supported on the frame is a seat 12 and a back rest 13.

Projecting forwardly from the frame members 2 and 3 is a pair of rigid frame extensions 14 and 15 which are coupled to foot rest supports 16 and 17, respectively, that are equipped with foot supporting members 18. The frame 1 is provided with front wheels 18 and rear wheels 20, the front wheels being steerable as is conventional.

The adjustable rotary locking and unlocking apparatus formed in accordance with one embodiment of the invention is designated generally by the reference character 21 and forms the coupling between the members 14, 15 and the foot rest supports 16, 17. Each of the locking and unlocking apparatuses 21 is the same, so FIGS. 2-9 disclose only one.

Figure 2:
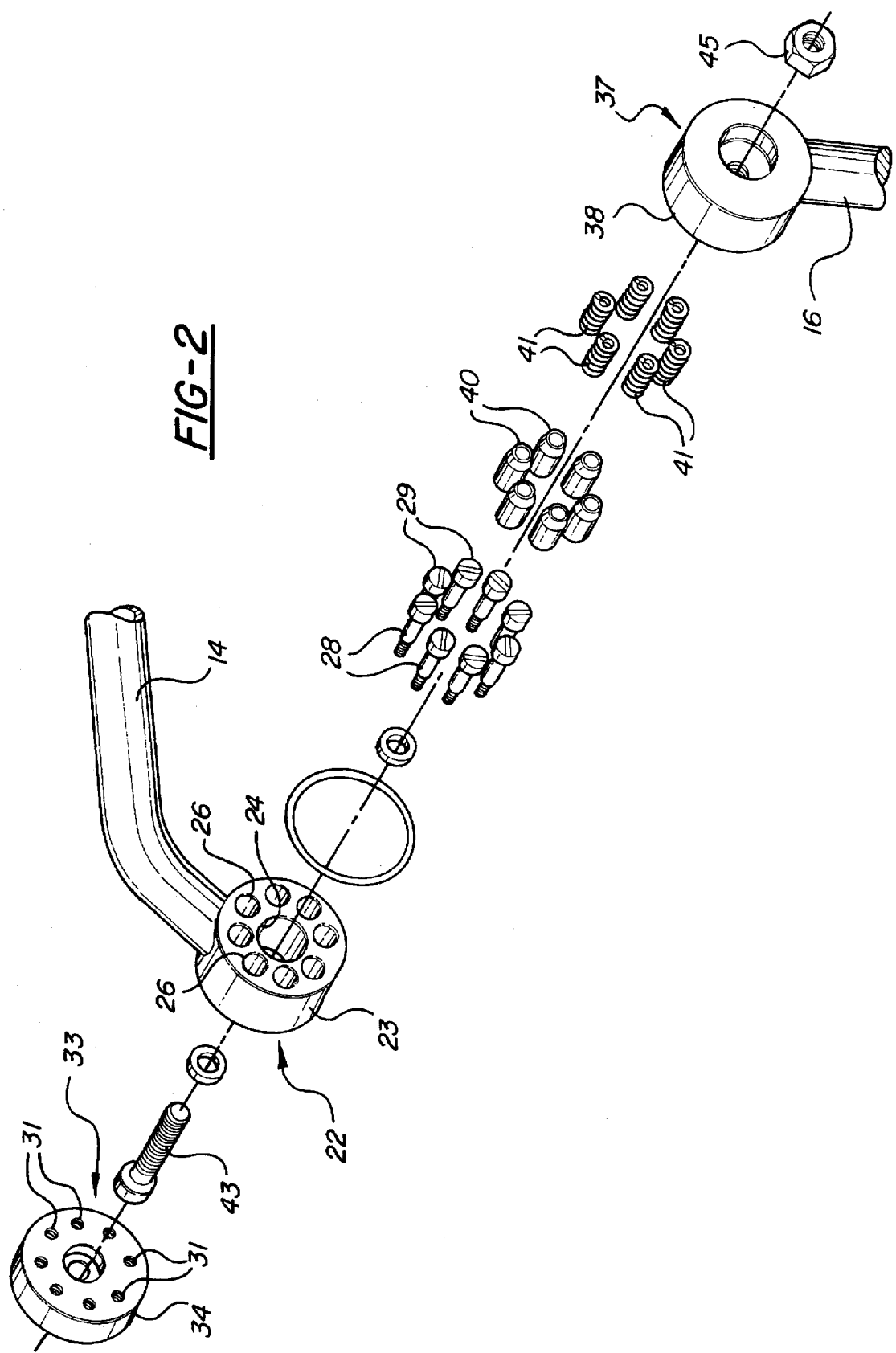
FIG. 2 is an exploded view of rotary adjusting apparatus constructed in accordance with a first embodiment of the invention.

As is best shown in FIG. 2, the frame extension 14 terminates at its forward end in a hub 22 having an annular collar 23 in which is a central opening 24 encircled by a planar face 25. The collar has a plurality of arcuately spaced sockets 26 extending inwardly from the face 25. In communication with each socket is a passage 27 that is open at its opposite ends. Slideably accommodated in each passage is an actuator 28 having a head 29 at one end accommodated in the associated socket and from which extends a stem 30 having an interiorly threaded blind bore 31. Accommodated in each bore is a threaded bolt 32.

An operating member 33 confronts that end of the collar 23 opposite the sockets 26 and comprises a disk 34 having a plurality of openings through which the shank of the bolt 32 extends. The disk 34 also has a plurality of circumferentially spaced openings 35 in which the heads 36 of the bolts 32 are accommodated.

At the upper end of each of the foot rest supports 16 and 17 is a hub 37 having an annular collar 38 that is provided with a plurality of circumferentially spaced bores 39 therein. Accommodated in each bore 39 is a locking pin 40 which is yieldably biased by a spring 41 to move in a direction outward of the associated bore.

The hub 37 has an annular boss 42 which extends into the central opening 24 of the hub 22 and provides a journal on which the hub 22 is rotatable. The hubs 22 and 37 have aligned openings through which a retaining bolt 43 extends, the bolt having a head 44 at one end and a nut 45 at the opposite end. The retaining bolt 43 forms an axis about which the hubs 22 and 37 are rotatable.

In the embodiment shown in FIGS. 3-5B, there are eight sockets 26 circumferentially spaced about the axis A. Each socket is uniformly spaced from its adjacent socket and each socket is spaced radially an equal distance from the axis A.

In the embodiment shown in FIGS. 3-5B, the hub 37 has six circumferentially spaced locking pins 40. The arcuate spacing between adjacent locking pins 40 is uniform and the radial spacing of each locking pin from the axis A also is uniform and corresponds to the radial spacing of the sockets 26. Although the circumferential spacing between adjacent locking pins 40 is uniform, such spacing differs from that of the sockets 26 since there are fewer locking pins than there are sockets. The arcuate spacing between each adjacent socket is 45°, whereas the arcuate spacing between adjacent locking pins 40 is 60°. The difference in the angular spacing between the sockets and pins, therefore, is 15°. The ratio defined by the angular locking pin and socket spacings is 45°/60° or 0.75, which is not a whole integer. Consequently not all of the locking pins can be accommodated in the sockets at the same time.

In the condition of the parts shown in FIGS. 3 and 5a, only two of the locking pins 40 are accommodated in two diametrally opposite sockets 26. The remaining locking pins bear upon the smooth face 25 of the collar 23. The two hubs 22 and 37, together with their respective members 14, 16, are disabled from relative rotation, because of the accommodation of the two locking pins in two of the sockets. As is best shown in FIG. 3, the locking pins 40 fit fairly snugly within the sockets 26 so as to minimize relative rotary movement between the hubs when they are disabled from relative rotation.

When it is desired to enable relative rotation between the hubs 22 and 37, the operator 33 is displaced to the right from the position shown in FIG. 3 to the position shown in FIG. 4 by the application of a force $F_1$. Such movement of the operator 33 will effect corresponding movement of all of the actuators 28 a distance to enable those locking pins 40 that are projected into the sockets to be displaced and occupy a position in which each locking pin 40 is wholly withdrawn from the sockets 26. See FIG. 4. It is essential that the movement of the actuators 28 be sufficient to effect complete withdrawal of all of the locking pins 40 from the sockets 26, but the movement should not be so great as to cause any part of an actuator 28 to project into any of the bores 39. The appropriate extent of movement of the actuators may be controlled by the extent to which the bolts 32 are threaded into the bores 31.

Once all of the locking pins 40 have been withdrawn from the sockets 26 relative rotary movement between the hubs 22 and 37 is enabled. As long as the force $F_1$ is applied to the operator 33 to maintain the parts in the positions shown in FIG. 4, relative rotation between the hubs 22 and 37 is unlimited. However, if the force applied to the operator 33 is removed following sufficient relative rotation of the hubs so that no locking pin projects into a socket 26, further relative rotation between the hubs will be limited to that which enables a locking pin 40 to register with one of the sockets 26, whereupon the spring 41 of the in-register locking pin will project the pin into the socket 26, thereby effecting displacement of all of the actuators 28 associated with the projected locking pins and restoration of the operator 33 to the position shown in FIG. 3. If desired, a spring (not shown) could be interposed between the cap 34 and the hub 22 so as to encircle the head 44 of the bolt 43 and exert a yieldable force on the operator tending to return it and all of the actuators 28 to their retracted positions.

If the force $F_1$ is removed following relative rotation of the hubs 22 and 37 to a position in which the projected locking pins 40 are withdrawn from the associated sockets 26 and bear upon the smooth face 25 of the hub 22 between adjacent sockets, further rotation in the same direction will cause one or more locking pins to be projected into those sockets with which they are in register. From a comparison of FIGS. 5A and 5B, relative rotation between the hubs 22 and 37 through increments of only 15° will cause two locking pins to be projected into two sockets 26 but these locking pins and sockets will be different from the locking pins accommodated in the sockets as shown in FIG. 5A. In the disclosed embodiment, relative rotation of the hubs 22 and 37 through 15° will enable two diametrally opposite locking pins to be projected into two diametrally opposite sockets, thereby disabling further relative rotation between the hubs.

In the embodiment shown in FIGS. 6A and 6B, there are eight locking pins 40 and nine sockets 26. The angular spacing between adjacent pins is 45°, whereas the angular spacing between the adjacent sockets is 40°. The difference in the angular spacings, therefore, is 5° and the ratio defined by the locking pins and the sockets angular spacings is 1.125, which is not a whole integer. Consequently, relative rotation of the hubs through increments of only 5° (when all locking pins are withdrawn from the sockets) will enable one or more locking pins to be projected into one or more sockets, as is shown in FIG. 6B, thereby disabling further relative rotation between the hubs. As will be apparent from FIGS. 6A and 6B, only one locking pin in this configuration of pins and sockets is projected into a socket at any one time.

Figure 7A:
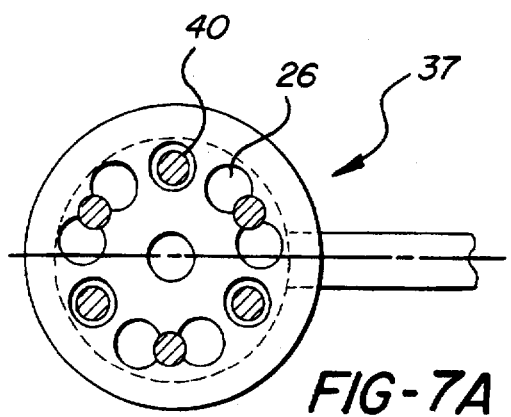
Figure 7B:
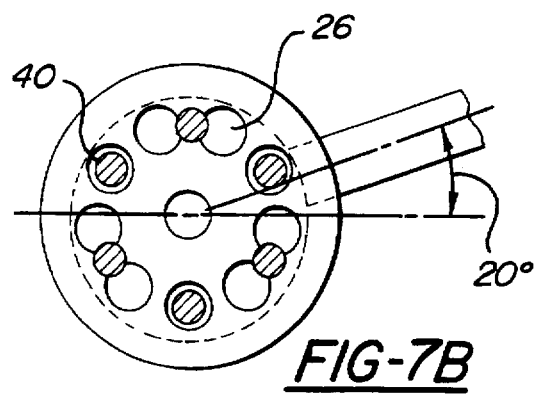

Other combinations of sockets and locking pins are possible. For example, FIGS. 7A and 7B show nine sockets 26 spaced 40° apart and six locking pins spaced 60° apart. The difference in the spacing, therefore, is 20° so that each increment of relative rotary adjustment of the hubs is 20°. The ratio defined by the angular spacings between the locking pins and the sockets is 1.5, which is not a whole integer. In the embodiment shown in FIGS. 7A and 7B, three locking pins will be accommodated in three sockets when the hubs are disabled from relative rotation.

Figure 8A:
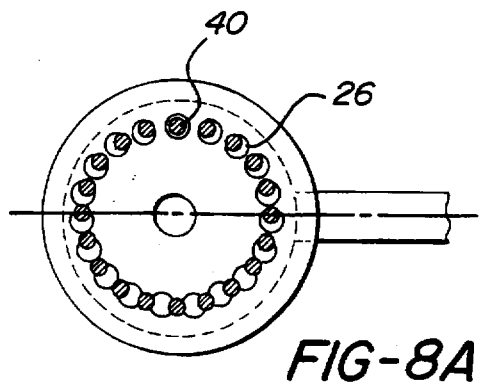
Figure 8B:
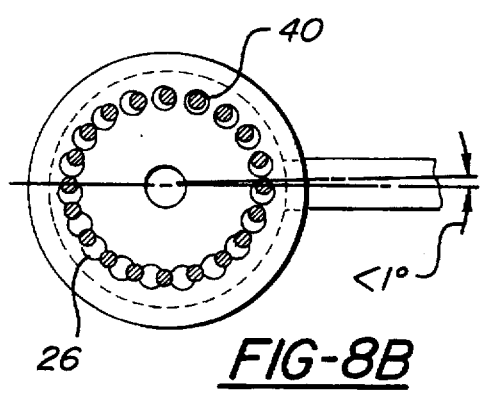

In the embodiment shown in FIGS. 8A and 8B, there are 19 sockets and 20 locking pins. Consequently, relative rotation between the hubs may be disabled in response to increments of slightly less than 1° of angular adjustment. In this embodiment the ratio defined by the angular spacings between the locking pins and sockets is 0.94.

Figure 9A:
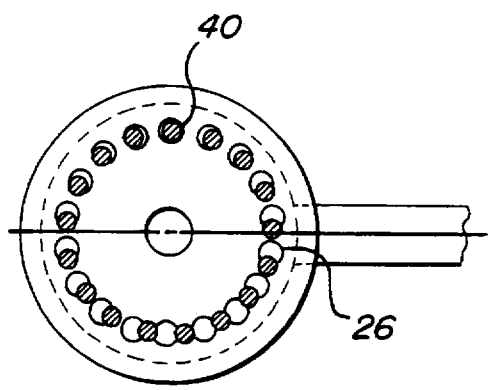
Figure 9B:
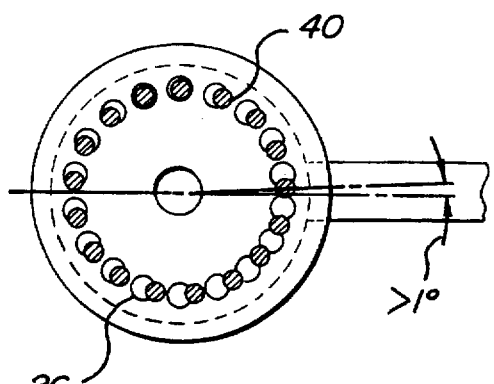

In the embodiment shown in FIGS. 9A and 9B, there are 18 sockets and 17 locking pins. It thus is possible to provide for incremental angular adjustment between the hubs of slightly more than 1°. In this embodiment the ratio defined by the angular spacings between the locking pins and sockets also is 0.94.

Other changes in the numbers of sockets and locking pins may be made. In all instances, however, there will be a difference in the number of locking pins and the number of sockets and, consequently, a difference between the angular spacings of the pins and sockets. The difference will depend upon factors such as the degree of incremental relative rotation desired and whether only one or more than one locking pin should be accommodated in a socket at any one time. The number of locking pins accommodated in sockets at any one time, of course, will affect the ability of the hubs to resist shearing of the locking pin or pins.

The embodiment shown in FIGS. 10–12 is similar in many respects to the embodiment just described, but differs in some of its structural characteristics. In the modified embodiment the frame member 14 is secured to a hub 46 comprising an annular body 47 having a smooth face 48 at one end which encircles a central bore 49. At its opposite end the body 47 has an annular extension 50 which lies radially inward of an annular face 51 in which is a plurality of circumferentially spaced sockets 52.

Confronting the hub 46 is a second hub 53 having a bore 54 in which the extension 50 is rotatably accommodated. The hub 53 has an annular body 55 and that face of the body 55 which confronts the hub 46 has a plurality of circumferentially spaced cavities 56 in each of which is a reciprocable locking pin 57. Each locking pin has a reduced diameter actuator 58 which extends through an opening 59 formed in the adjacent face 60 of the hub 53. A spring 61 yieldably biases the associated locking pin 56 to the projected position shown in FIG. 11.

The hubs 46 and 53 are maintained assembled in relatively rotatable condition by a central shaft 62 having a head 63 at one end and a nut 64 at its other end. The shaft 62 defines an axis B about which the hubs are relatively rotatable.

Each of the actuators 58 slideably extends through an opening 65 formed in an operator 66 comprising a cap or disk 67. Secured to the free end of each actuator 58 is bolt 68 having an enlargement 69 which is adapted to bear against the outer surface 70 of the disk 67. Each of the actuators 58 is moveable relative to the disk 67 and the enlargements 69 of the associated bolts 68 limit relative movement of the disk 67 in one direction relative to the associated actuator. Secured to the disk 67 is an extension 71 which may be gripped by a person to effect movement of the actuators and all of the associated locking pins 57 simultaneously.

As is the case with the first-described embodiment, the hub 46 has a plurality of circumferentially spaced sockets 52, each of which is spaced uniformly from the axis B. The arcuate spacing between adjacent sockets is uniform. The hub 53 carries a plurality of circumferentially spaced locking pins 57, the radial spacing of which from the axis B corresponds to that of the socket 52. The number of locking pins 57 is different from the number of sockets 52, as is the case in the first-described embodiment, and the number of locking pins may be either fewer or greater than the number of sockets. However, the arcuate spacing between adjacent locking pins is uniform.

When the parts are in the positions shown in FIG. 11, at least two of the locking pins 57 occupy a projected position in which they are accommodated in two of the sockets 52. The projected locking pins bridge the joint between the hubs 46 and 53 and, accordingly, disable relative rotation therebetween. Those locking pins which are not accommodated in sockets bear against the smooth face of the hub 46 between adjacent sockets. Thus, the actuators of the locking pins which do not project into the socket occupy a position different from that of the projected locking pins.

When it is desired to effect relative rotation between the hubs 46 and 53, the operator 66 may be moved in a direction to withdraw the projected locking pins from the sockets by the application of a force $F_2$ on the extension 71. See FIG. 12. This will cause the disk 67 to engage the enlargements 69 of the bolts 68 and effect simultaneous withdrawal of all of the projected locking pins to the retracted position shown in FIG. 12 in which no part of a locking pin extends into any socket. The hubs 46 and 53 then may be rotated relative to one another.

As long as the force $F_2$ is applied, relative rotation between the hubs 46 and 53 is enabled. When the force $F_2$ is released, however, the spring 61 associated with each locking pin will enable any locking pin that moves into register with a socket 52 to be projected into such socket, thereby disabling further relative rotation of the hubs.

As is the case in the first embodiment, the difference in the number of locking pins and sockets enables incremental relative arcuate adjustment of the hubs through virtually any selected arc. In the form shown, there are eight sockets 52 and six locking pins. The spacing between adjacent sockets is 45° and the spacing between adjacent pins is 60° and the ratio defined by this difference between the locking pin and socket spacings is 1.33. The hubs, therefore, are capable of incremental rotation of 15° between successively fixed positions.

In the disclosed embodiments the hubs are capable of relative rotation through 360°. However, the principles of the invention are applicable to constructions wherein such extensive rotation is not necessary. If, for example, rotation through only 180° is required, the number of locking pins and sockets may be decreased.

The disclosed embodiments are representative of presently preferred forms of the invention, but are intended to be illustrative rather than definitive thereof. The invention is defined in the claims.

We claim:

1. Adjustable rotary locking and unlocking apparatus for respectively disabling and enabling relative rotary movement, said apparatus comprising:

a) a first member having a first hub;

b) a second member having a second hub;

c) means coupling said hubs for relative rotation of said hubs and said members about a common axis;

d) a plurality of arcuately spaced locking pins carried by one of said hubs for movements relative thereto between retracted and projected positions;

e) a plurality of arcuately spaced sockets in the other of said hubs, f) the spacing and number of said locking pins being different from the spacing and number of said sockets but said locking pins and said sockets being uniformly spaced radially from said axis, g) each of said sockets being of such size as to accommodate any one of said locking pins, h) relative rotation of said hubs about said axis enabling different ones but fewer than all of said locking pins to register with said sockets;

i) means for moving any one of said locking pins that is in register with one of said sockets to its projected position in said one of said sockets thereby locking said hubs and said members against relative rotation; and j) means for moving any one of said locking pins from its projected position in said one of said sockets to its retracted position thereby unlocking said hubs and said members and enabling relative rotation therebetween.

2. The apparatus according to claim 1 wherein said means for moving said one of said locking pins in register with one of said sockets comprises a spring.

3. The apparatus according to claim 1 wherein said means for moving said one of said locking pins to its retracted position comprises an actuator operable to act on said one of said locking pins and move it out of said one of said sockets.

4. The apparatus according to claim 1 wherein the number of said sockets is greater than the number of said locking pins.

5. The apparatus according to claim 1 wherein the number of said sockets is at least one greater than the number of said locking pins.

6. The apparatus according to claim 1 wherein the arcuate spacing between successive ones of said locking pins is uniform.

7. The apparatus according to claim 1 wherein the arcuate spacing between successive ones of said sockets is uniform.

8. The apparatus according to claim 1 wherein the difference in number between said locking pins and said sockets is such that only one of said locking pins may occupy a projected position at the same time.

9. The apparatus according to claim 1 wherein the difference in number between said locking pins and said sockets is such that at least two, but less than all, of said locking pins may occupy a projected position at the same time.

10. The apparatus according to claim 1 wherein the number of said locking pins is greater than the number of said sockets.

11. The apparatus according to claim 1 wherein the number of said locking pins is at least one greater than the number of said sockets.

12. Adjustable rotary locking and unlocking apparatus for respectively disabling and enabling relative rotary movement, said apparatus comprising:

a) a first member;

b) a second member;

c) means mounting said members for relative rotation about a common axis;

d) a plurality of arcuately spaced locking pins carried by one of said members;

e) a plurality of arcuately spaced sockets in the other of said members, f) each of said locking pins being of such size as to be accommodated in each of said sockets, g) the arcuate spacing between adjacent ones of said sockets being different from the arcuate spacing between adjacent ones of said locking pins but each of said sockets and each of said locking pins being equally spaced from said axis, h) the difference in the spacing and in the number of said locking pins and said sockets being such that in no position of said members are all of said locking pins in register with said sockets;

i) yieldable means biasing said locking pins for movement from a retracted position in which said locking pins are withdrawn from all of said sockets to a projected position in which any one of said locking pins that is in register with one of said sockets may be accommodated therein; and j) operating means coupled to all of said locking pins and being operable to move all of said locking pins to said retracted position thereby enabling relative rotation of said members about said axis.

13. Apparatus according to claim 12 wherein all of said locking pins are carried by said one of said members and all of said sockets are in the other of said members.

14. Apparatus according to claim 12 wherein said yieldable biasing means comprises a number of springs corresponding to the number of said locking pins, each of said springs yieldably urging its associated one of said locking pins to said projected position.

15. Apparatus according to claim 14 wherein said operating means is coupled to each of said locking pins and is operable to overcome the force of said springs and move all projected ones of said locking pins simultaneously out of said sockets to the retracted position.

16. Apparatus according to claim 15 wherein said operating means comprises a cap through which each of said locking pins slideably extends, and means reacting between said cap and each of said locking pins for limiting sliding movement of each of said pins in one direction relative to said cap.

* * * * *